United States Patent [19]

Chatzipetros

[11] Patent Number: 5,554,996
[45] Date of Patent: Sep. 10, 1996

[54] ANTENNA FOR COMMUNICATION DEVICE

[75] Inventor: Argyrios Chatzipetros, Plantation, Fla.

[73] Assignee: Motorola, Inc., Schaumburg, Ill.

[21] Appl. No.: 525,896

[22] Filed: Sep. 8, 1995

Related U.S. Application Data

[63] Continuation of Ser. No. 275,565, Jul. 15, 1994, abandoned.

[51] Int. Cl.⁶ .................................................... H01Q 1/24
[52] U.S. Cl. ............................ 343/702; 343/893; 455/89
[58] Field of Search ..................................... 343/702, 833, 343/893, 901; 455/89, 277, 347, 351; H01Q 1/24

[56] References Cited

U.S. PATENT DOCUMENTS

| | | | |
|---|---|---|---|
| 4,992,799 | 2/1991 | Garay | 343/702 |
| 5,014,346 | 5/1991 | Phillips et al. | 343/702 |
| 5,170,173 | 12/1992 | Krenz et al. | 343/702 |
| 5,258,892 | 11/1993 | Stanton et al. | 361/814 |
| 5,337,061 | 8/1994 | Pye et al. | 343/702 |

*Primary Examiner*—Michael C. Wimer
*Attorney, Agent, or Firm*—John G. Rauch; Barbara R. Doutre

[57] ABSTRACT

A diversity handset (100) used in a personal communication system includes a flap (104), a first antenna (108) and second antenna (110). The second antenna (110) consists of two portions, the first portion being a direct feed portion (202) printed onto a substrate (206), and the second portion consisting of a parasitic radiator (116) located within the flap (104). The first and second portions (202) and (116) of the second antenna (110) are inductively coupled together between the flap (104) and the substrate (206). Diversity is maintained with the flap (104) open or closed as well as with the flap removed from the handset (100).

6 Claims, 3 Drawing Sheets

5,554,996

ANTENNA FOR COMMUNICATION DEVICE

This is a continuation of application Ser. No. 08/275,565, filed Jul. 15, 1994 and now abandoned.

TECHNICAL FIELD

This invention relates to antennas, and more specifically to antennas for communication devices.

BACKGROUND

Personal communication systems (PCS) employ cordless handsets that are often designed as small as possible in order to make the devices more readily portable. In order to keep the handset readily portable, features such as retractable antennas are incorporated into the handset so that the handset won't occupy as much space when inserted into a pocket or briefcase. In systems requiring antenna diversity, a second antenna is incorporated into the handset and thus presents the challenge of keeping the handset performance at an optimum level while providing an ergonomically suitable solution for the user. In handsets having flaps, a possible solution to this problem is incorporating the second antenna into the flap. Current flap antennas are typically connected to the handset transceiver using a coaxial cable or a flexible circuit interconnect (flex). However, the use of flex circuits and coaxial cable can often present difficult assembly issues in a factory where assembly time and manufacturing reliability are of prime importance. Mechanical problems may also arise with regards to the wear and tear incurred to flex circuits and coaxial cable as the flap is repeatedly opened and closed. Furthermore, antennas incorporated entirely into the flap normally become detuned when the flap is closed, because the antenna couples to a ground potential (GND) plane of the transceiver. Thus, a handset having an antenna incorporated entirely into the flap requires that the flap remain open in order for the antenna to function properly. In addition, for handsets that are designed without a flap, a problem arises of where to place the second antenna when diversity is required as part of the communication protocol.

Hence, there is a need for an antenna that can be incorporated into a communication device that provides an improved interconnect between the flap and the transceiver in order to reduce assembly time and cost in the factory. This antenna should further provide operation in both an opened and closed flap position. Additionally, a handset not having a flap and providing diversity would be of benefit to the user who does not desire a flap.

DETAILED DESCRIPTION OF THE PREFERRED EMBODIMENT

Figure 1:
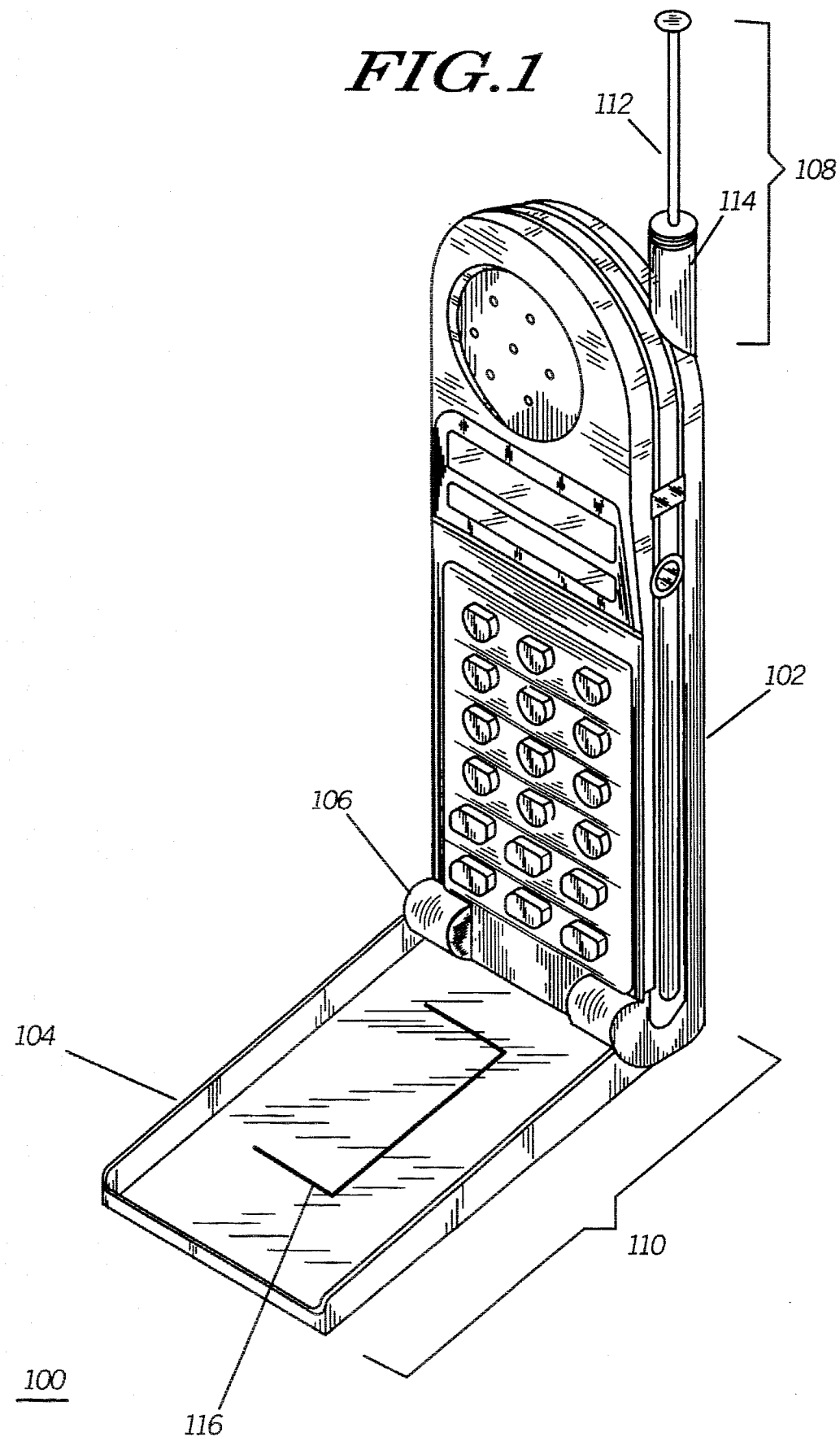
FIG. 1 is a drawing of a communication device in accordance with the present invention.

FIG. 1 of the accompanying drawings depicts a portable radio, or handset, 100 in accordance with the preferred embodiment of the present invention. The invention to be described herein applies to a cordless telephone second generation handset (CT2) but other communication devices could be used as well. The handset 100 includes a housing 102 and a flap 104 coupled to the housing through a hinge 106. Handset 100 also includes first and second antennas 108 and 110 respectively. The first antenna 108 is a standard extendible antenna consisting of two main sections, a parasitic radiator section which is shown as the extended section 112 and a direct feed portion 114 located within housing 102 and connected to the transceiver section of a printed circuit board (not shown) located within housing 102. When extended, the two portions 112 and 114 inductively couple and are used as the complete antenna 108. When the parasitic radiator section 112 is retracted only the direct feed section 114 is used for the antenna 108. In the retracted position, performance is somewhat degraded since only the direct feed section 114 is being used to receive or transmit a radio frequency (RF) signal. A half inch length of plastic at either end of the parasitic radiator section 112 allows the two portions to couple inductively when in the extended position and allows only the use of the direct feed section 114 when in the retracted position.

Included in the handset 100 is the second antenna 110 which is divided into two portions. The first portion (to be shown later) of the second antenna 110 is located within the housing 102 while the second portion is a parasitic radiator 116 located within the flap 104. The second antenna 110 will be described in detail in FIG. 2, but briefly, in accordance with the present invention, inductive coupling between the first and second portions creates the second antenna. The extendible antenna 108 and the second antenna 110 provide diversity to the handset 100.

In the preferred embodiment of the invention, the flap 104 can be moved between first and second positions where the first position is preferably an opened position and the second position is a closed position. The flap is preferably made of a plastic material and incorporates a conductive material, such as copper, deposited in a predetermined form on the plastic surface, forming the parasitic radiator 116. The conductive material can be imbedded within the plastic as well. The second antenna 110 to be described herein provides the handset with the ability to provide diversity with the flap open, closed, or even with the flap removed entirely from the handset.

Figure 2:
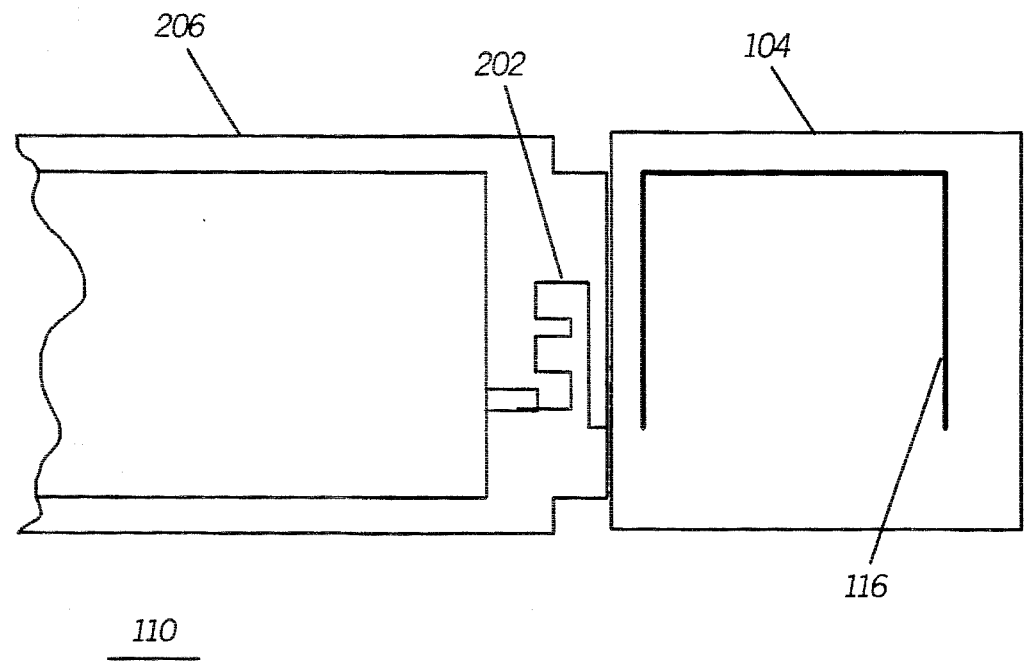
FIG. 2 is a drawing illustrating the preferred embodiment of the antenna in accordance with the present invention.

FIG. 2 of the accompanying drawings shows the preferred embodiment for the second antenna 110 in accordance with the present invention. The antenna 110 is split into two portions resonant at the frequency of interest, the direct feed radiator portion 202 and the parasitic radiator portion 116. The antenna 110 is also comprised of a substrate 206, preferably the transceiver section of the handset 100, which includes the direct feed portion 202. The flap 104, which couples to the housing (as shown is FIG. 1), includes the parasitic radiator 116. In the preferred embodiment, the direct feed portion 202 is incorporated as a microstripline into the layout of the printed circuit board substrate 206, and the micro-stripline is resonant at the frequency of interest. The substrate material is preferably a fire-retardant epoxy resin/glass cloth laminate (FR-4) material, but other pcb substrates known in the art can also be used.

The parasitic radiator 116 may be applied to the flap 104 using a conductive material such as copper tape or conductive paint as shown in FIGS. 1 and 2. While the preferred embodiment describes the flap 104 as being manufactured of plastic, other materials, such as the pcb substrate material, could also be used. By incorporating the parasitic radiator 116 to the flap and inductively coupling it to the direct feed portion 202 of the printed circuit board 206, the need for an interconnect of coaxial cable or flex between the transceiver and the flap is eliminated.

The pattern of the micro-stripline for the direct feed portion 202 can be designed in any shape that is resonant at the frequency of interest. In the preferred embodiment, the direct feed portion 202 is preferably a quarter wavelength feed resonant at frequencies over the 864–868 MHz (megahertz) range while the parasitic resonator portion 116 is preferably a half wavelength radiator resonant at the same frequency of interest.

In the preferred embodiment of the invention the direct feed portion 202 of the antenna 110 is a quarter wavelength radiator, however other lengths in increments of quarter wavelengths, such as a half wavelength and full wavelength could be used as well. The parasitic radiator 116 while preferably a half wavelength could also be designed to other wavelengths in half wavelength increments. For optimum performance the two resonating elements 202 and 116 are preferably designed so that when the flap 104 is moved to the closed position the two elements do not overlap.

In order to provide diversity, the antenna 110 as described by the invention can be incorporated into a handset already having a standard extendible antenna 108 as described in FIG. 1. Since some users prefer a handset with a flap, the diversity feature is incorporated without the user being required to perform any extra steps other than those he or she is already used to. When the flap 104 is left open, either the first antenna 108 or the second antenna 110 may receive and transmit the RF signal depending on the direction of the signal and the position of the handset. When the flap 104 is closed, either the first antenna 108 or the direct feed portion 202 of the second antenna 110 provides the means with which to receive or transmit the RF signal. While optimum performance is provided with the flap 104 in the open position, the direct feed portion 202 of the second antenna 110 still provides for diversity in the handset 100 with the flap closed. For customers wanting to remove the flap 104, only the direct feed portion 202 will be used as the second antenna. When the flap 104 is closed or when the flap is removed, the direct feed portion 202 acts as an antenna itself, because it has not moved from its original location.

Figure 3:
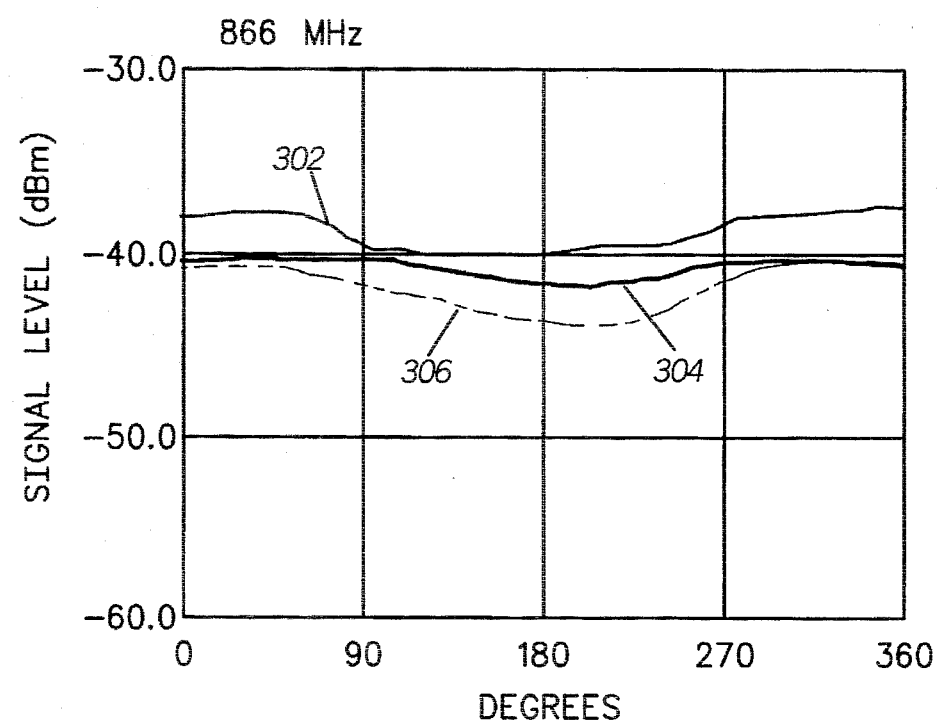
FIG. 3 is a graph comparing the antenna as described by the invention to a dipole in free space.

Referring now to FIG. 3, a graph is shown representing an example of data collected comparing the performance of the handset including antenna 110, as described by the invention, with the flap open and the flap closed, to a dipole in free space. The data was taken in an anechoic chamber and is representative of the performance of the antennas in free space. All power levels are measured in decibels relative to one milliwatt (dBm). The dipole is used as a reference and is rotated about a 360° radius with transmit power levels being monitored. Line 302 represents the dipole in free space and has an average power of −39.1 dBm while line 304 represents the antenna as described by the invention with the flap open and has an average power level of −40.9 dBm (or 1.8 dB below the reference dipole). Line 306 represents the antenna as described by the invention with the flap closed and measures an average power of −42.1 dBm. The overall delta in power level between the flap closed and the reference dipole is only 3 dB which is considered an acceptable level of degradation. Since the handset 100 with the flap 104 in the closed position is basically using only the direct feed 202 as the means for receiving the RF signal, acceptable performance can be expected with and without the flap.

Figure 4:
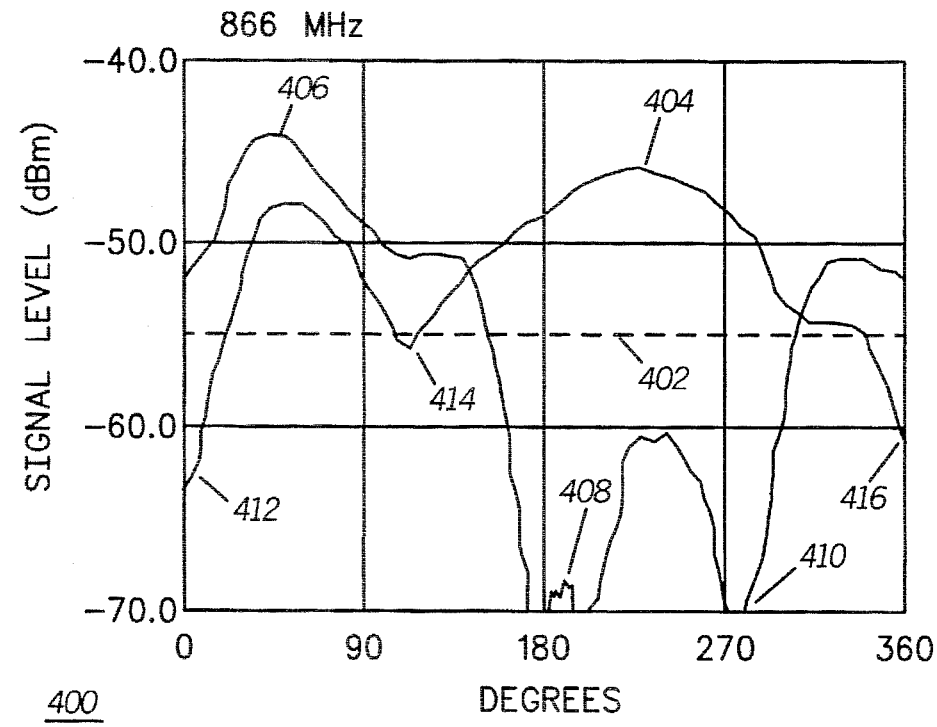
FIG. 4 is a graph comparing a standard extendible antenna with the antenna in accordance with the present invention.

Referring now to FIG. 4 there is shown a graph 400 illustrating a sample of data representing transmit power levels at the individual antennas 108 and 110 while the handset 100 is held by a user. Line 402 represents an acceptable threshold in dBm above which the transmit power level of an RF signal must be maintained in order to maintain a communication link. The individual antennas 108 and 110 were measured separately in order to compare their respective signal strengths. Line 404 represents the power level in dBm transmitted by the first antenna which is the standard extendible antenna. Line 406 represent the power level transmitted by the second antenna 110 as described by the invention with the flap open. The average power level for the standard extendible antenna 108 in the extended position measured −49.8 dBm while the average power level for the antenna 110 with the flap in the open position measured −51.2 dBm.

The data from the graph 400 represents the user being rotated about a 360° radius with the transmit power level being monitored. As can be seen from the graph 400, the flap antenna (line 406) dips below the threshold at two main locations 180° (point 408) and 270° (point 410). These dip location at point 408 corresponds to the back of the user's head facing the radiating element with the flap facing forward, while the dip at point 410 corresponds to the user's hand obstructing the flap. The standard antenna (line 404) dips below the threshold at 0°, 100° an 360° represented by designators 412, 414, and 416 respectively. The two antennas 108 and 110 basically act as compliments of each other. Thus, in a diversity handset, as the received or transmitted signal from one antenna fades then the other antenna can be switched in to maintain the communication link.

Figure 5:
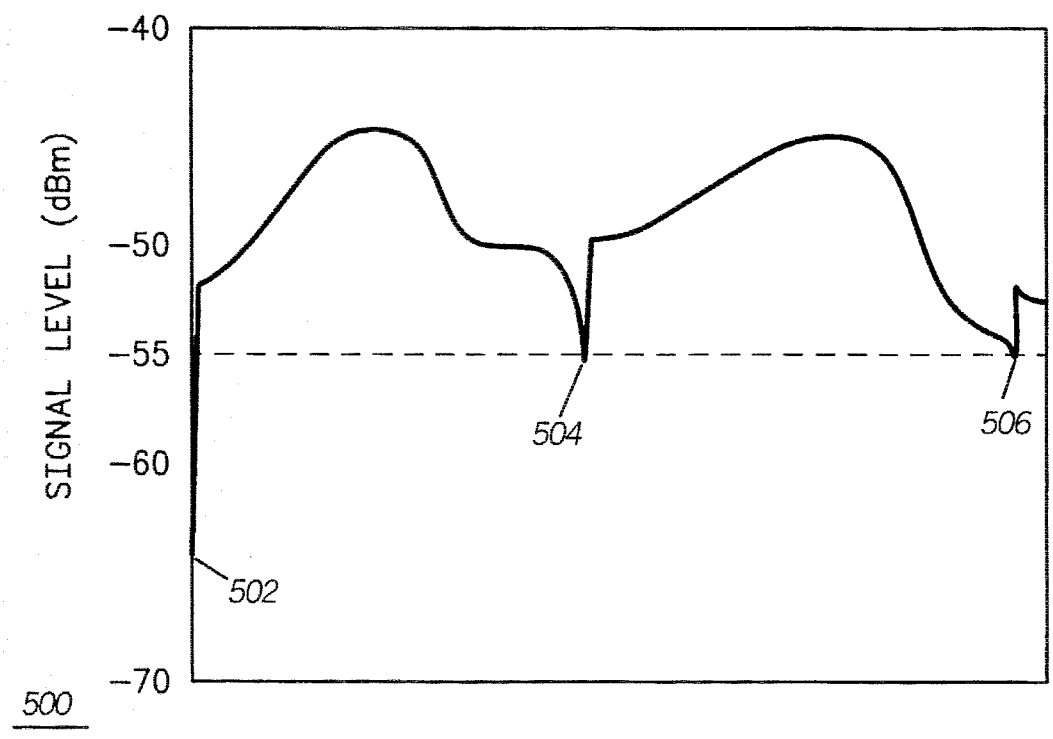
FIG. 5 is a graph illustrating the expected performance of the handset in accordance with the preferred embodiment of the invention based on the data shown in FIG. 4

FIG. 5 is a graph that illustrates the expected transmit power levels, based on the graph of FIG. 4, of the diversity handset 100 switching between the standard extendible antenna 108 in the extended position and the antenna as described by the invention 110 with the flap 104 open. Designator 502 represents a change from the standard antenna 108 to the second antenna 110, designator 504 represents a change back to the standard antenna 108, and designator 506 represents a switch back to the second antenna 110. By improving the ability to transmit and receive the RF power signal, the range over which the handset can operate is increased.

Improved antenna performance in a communication device can be achieved by incorporating the antenna 110 as described by the invention in conjunction with the standard extendible antenna 108. By inductively coupling the parasitic radiator portion to the direct feed portion, the need for a coaxial cable or other transmission line going through the hinge is eliminated. This simplifies the assembly of the handset and increases the reliability of the antenna when the flap is repeatedly opened and closed over time. The handset continues to provide diversity whether the flap is opened or closed since the performance of the direct feed portion remains substantially the same regardless of the position of the flap. Furthermore, the user may remove the flap and continue to use the handset using the standard extendible antenna as the first antenna and the direct feed portion as the second antenna.

What is claimed is:

1. A communication device, comprising:

a housing;

a substrate located within the housing;

an extendible antenna coupled to the housing;

a direct feed radiator disposed upon the substrate, the direct feed radiator and extendible antenna providing antenna diversity to said communication device; and a flap;

the housing including a means for receiving the flap and coupling the flap to the housing, the flap including a parasitic radiator positioned to inductively couple to the direct feed radiator when the flap is coupled to the housing.

2. A communication device as described in claim 1, wherein the flap operates between a first position and a second position when coupled to the housing, the first position allowing the direct feed radiator to operate as an independent antenna while the second position allows the direct feed radiator inductively coupled to the parasitic radiator to operate as the independent antenna.

3. A communication device comprising:

a housing having a first end and a second end, the housing defining a cavity;

a transceiver circuit located within the cavity;

a flap rotatably coupled to the housing at the first end, the flap rotatable between a closed position adjacent the housing and an open position projecting from the housing;

an antenna including:

a direct feed portion located within the cavity proximate the first end of the housing and directly coupled to the transceiver circuit;

a resonant parasitic radiator portion positioned within the flap so as to be inductively coupled with the direct feed portion when the flap is in the open position; and an extendible antenna coupled to the second end of the housing and configured to be extended from the second end of the housing, the extendible antenna being directly coupled to the transceiver circuit to provide antenna diversity for the communication device.

4. A communication device as described in claim 3 wherein the direct feed portion comprises a substantially quarter wavelength direct feed radiator and wherein the resonant parasitic radiator portion comprises a substantially half wavelength resonant parasitic radiator portion.

5. A communication device as described in claim 3 wherein the resonant parasitic radiator portion resonates at a predetermined frequency of interest in response to the direct feed portion.

6. A communication device as described in claim 3 wherein, when the flap is in the open position, one of the antenna and the extendible antenna selectively receive and transmit radio frequency signals, and when the flap is in the closed position, one of the direct feed portion and the extendible antenna selectively receive and transmit radio frequency signals.

* * * * *